(12) United States Patent
Morino

(10) Patent No.: US 11,718,053 B2
(45) Date of Patent: Aug. 8, 2023

(54) STITCHER DEVICE

(71) Applicant: Toyo Tire Corporation, Itami (JP)

(72) Inventor: Hiroaki Morino, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/546,530

(22) Filed: Dec. 9, 2021

(65) Prior Publication Data

US 2022/0219419 A1 Jul. 14, 2022

(30) Foreign Application Priority Data

Jan. 8, 2021 (JP) .................................. 2021-002417

(51) Int. Cl.
  *B29D 30/28* (2006.01)
  *B29D 30/14* (2006.01)
  *B29D 30/00* (2006.01)
  *B29D 30/20* (2006.01)
  *B29D 30/08* (2006.01)

(52) U.S. Cl.
  CPC ............. *B29D 30/28* (2013.01); *B29D 30/14* (2013.01); *B29D 30/0016* (2013.01); *B29D 2030/088* (2013.01); *B29D 2030/202* (2013.01)

(58) Field of Classification Search
  CPC ........................... B29D 30/0016; B29D 30/14; B29D 30/2607; B29D 30/28; B29D 2030/0022; B29D 2030/088; B29D 2030/202; B29D 2030/3257; B29D 2030/3264; B29D 2030/582
  USPC ...................................... 156/130.3, 421, 511
  See application file for complete search history.

(56) References Cited

U.S. PATENT DOCUMENTS

| 4,039,366 A | * | 8/1977 | Yabe | ..................... B29D 30/28 156/413 |
| 2009/0133808 A1 | | 5/2009 | Tatara et al. | |
| 2010/0043949 A1 | | 2/2010 | Fujiki et al. | |

FOREIGN PATENT DOCUMENTS

| CN | 102049871 A | | 5/2011 | |
| CN | 203517077 U | | 4/2014 | |
| JP | 61167538 A | * | 7/1986 | ......... B29D 30/2607 |
| KR | 1595487 B1 | * | 2/2016 | ......... B29D 30/2607 |
| WO | 2006/048924 A1 | | 5/2006 | |

(Continued)

OTHER PUBLICATIONS

Nishimoto K, WO-2011118166-A1, machine translation. (Year: 2011).*

(Continued)

*Primary Examiner* — Robert C Dye
*Assistant Examiner* — Sedef E Paquette
(74) *Attorney, Agent, or Firm* — WHDA, LLP

(57) ABSTRACT

A stitcher device presses a carcass ply to be pressure-bonded to a rubber member after that the carcass ply is wound around an outer periphery of a building drum movable along a drum guide path via a rubber member. The stitcher device includes an annular frame that is able to surround the outer periphery of the building drum by inserting the building drum thereinto, and a pressure-bonding device provided in the annular frame so as to be able to press the carcass ply from its outer periphery and pressure-bond the carcass ply to the rubber member. The annular frame is provided so as to be openable and closable by being divided into a plurality of parts in a peripheral direction.

8 Claims, 9 Drawing Sheets

(56) References Cited

FOREIGN PATENT DOCUMENTS

WO       2007/080640 A1     7/2007
WO     WO-2011118166 A1 *  9/2011   ......... B29D 30/2607

OTHER PUBLICATIONS

Gokawa J, JP-61167538-A, machine translation. (Year: 1986).*
Kang J G, KR-1595487-B1, machine translation. (Year: 2016).*
Office Action dated Apr. 28, 2023, issued in counterpart CN Application No. 202111497682.8, with English translation. (16 pages).

\* cited by examiner

STITCHER DEVICE

CROSS-REFERENCE TO RELATED APPLICATIONS

This application is based upon and claims the benefit of priority from the prior Japanese Patent Application No. 2021-002417, filed on Jan. 8, 2021; the entire contents of which are incorporated herein by reference.

BACKGROUND

1. Field of the Invention

Embodiments of the present invention relate to a stitcher device used for building a carcass band in a tire building device for building a green tire.

2. Description of the Related Art

In general, a pneumatic tire is configured to include a plurality of rubber members and a plurality of reinforcing members each having a cord as a main material. Typically, as shown in FIG. 12, each part of a tire T, such as an inner liner 1, a tread rubber 2, sidewall rubbers 3, and rim strips 4, is formed of rubber members according to a required characteristic. The tire T is configured by combining these rubber members with a belt ply 5, a carcass ply 6, a bead 7, and the like, which are reinforcing members including a cord.

The following method is used as a method for building such a tire. The carcass ply is laminated on the rubber member including the inner liner to build a cylindrical carcass band. Next, bead set and turn-up are performed on the carcass band to build a cylindrical green case. A cylindrical belt band in which a belt, a tread, and the like are laminated is assembled and combined to an outer periphery of the green case to build a green tire (an unvulcanized tire). In addition, in order to improve productivity, it is known that a step of building a carcass band, a step of building a green case, a step of building a belt band, and a step of combining the green case and the belt band are performed by using separate building drums (see WO 2006/048924 (US 2009/0133808 A1)).

In addition, in the step of building the carcass band, the following method is known. The rubber member such as the inner liner is wound around an outer periphery of a building drum movable along a drum guide path, and the carcass ply is attached thereon. Then, by pressing the carcass ply from its outer periphery by using a stitcher device, air between the carcass ply and the rubber member inside the carcass ply is discharged, and the carcass ply is pressure-bonded to the rubber member (see WO 2007/080640 (US 2010/0043949 A1)).

SUMMARY

When different building drums are used in the step of building the carcass band and the step of building the green case thereafter, it is necessary to transfer the carcass band to the building drum for building the green case by a transfer device. In this case, in order to deliver the building drum having the carcass band after building to the transfer device, the building drum is moved to a carcass band take-out position.

When the carcass band is taken out in this way, from the viewpoint of productivity, it may be desirable to provide a stitcher device for pressure-bonding the carcass ply between a building position for winding the carcass ply and the take-out position of the carcass band. However, in such a case, if the stitcher device including an annular frame surrounding the outer periphery of the building drum is used, the following problem occurs. That is, in order to move the building drum having the carcass band after pressure-bonding to the take-out position, once the building drum is retracted, the stitcher device must be withdrawn from the drum guide path and then the building drum is advanced. Therefore, it takes time to take out the carcass band.

Embodiments of the invention have been made in view of such a problem, and have an object to provide a stitcher device capable of moving a building drum after pressure-bonding a carcass ply to a carcass band take-out position without retracting the building drum.

The stitcher device according to an embodiment of the invention is a stitcher device for pressure-bonding a carcass ply, which is wound around an outer periphery of a building drum movable along a drum guide path via a rubber member, to the rubber member. The stitcher device includes an annular frame that is able to surround the outer periphery of the building drum by inserting the building drum thereinto, and a pressure-bonding device provided in the annular frame so as to be able to press the carcass ply from its outer periphery and pressure-bond the carcass ply to the rubber member, wherein the annular frame is provided so as to be openable and closable by being divided into a plurality of parts in a peripheral direction.

In the stitcher device according to the embodiment of the invention, the annular frame provided with the pressure-bonding device is configured so as to be openable and closable by being divided into a plurality of parts in a peripheral direction. Therefore, after pressure-bonding with the pressure-bonding device, it is possible to pass through the building drum by opening the annular frame. Thus, the building drum can be moved to a carcass band take-out position along the drum guide path without retracting the building drum after the carcass ply is pressure-bonded.

DESCRIPTION OF THE PREFERRED EMBODIMENTS

Hereinafter, embodiments of the invention will be described with reference to the drawings.

Figure 1:
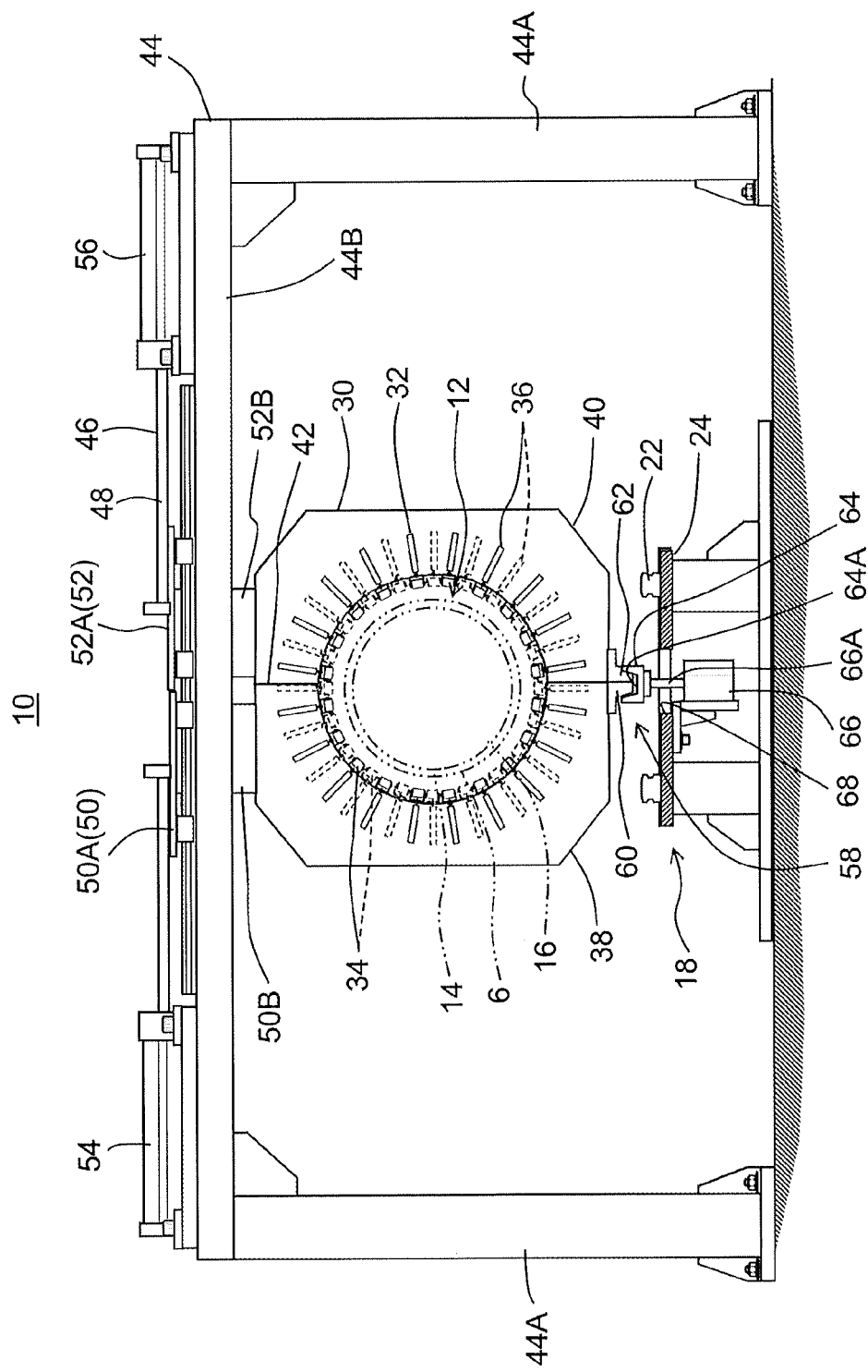
FIG. 1 is a front view of a stitcher device according to an embodiment.

A stitcher device 10 according to an embodiment shown in FIG. 1 is used to press an outer periphery of a carcass ply 6 and pressure-bond it to a rubber member 14 on an inner peripheral side when building a carcass band 12 in a tire building device for building a green tire.

Figure 12:
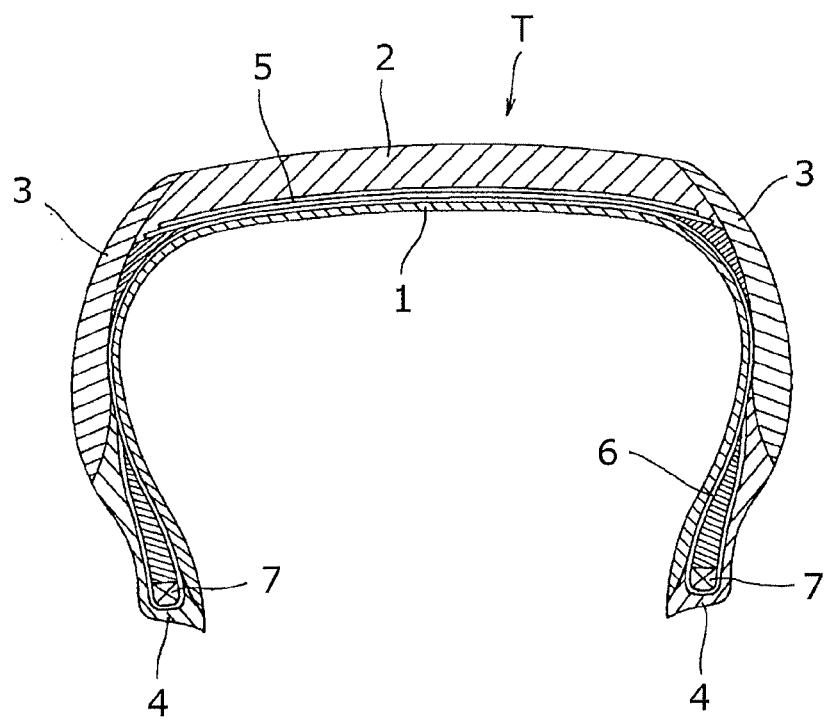
FIG. 12 is a cross-sectional explanatory view of a tire structure.

Here, the carcass band 12 is a cylindrical tire constituent member including the rubber member 14 including an inner liner and the carcass ply 6 laminated on an outer periphery of the rubber member 14. Examples of the rubber member 14 include the inner liner 1, rim strips 4, sidewall rubbers 3, and a squeegee (not shown) (see FIG. 12). The carcass ply 6 is made of one or a plurality of ply sheets in which reinforcing cords are embedded, and a ply tape (not shown) may be attached between the ply sheets.

Figure 2:
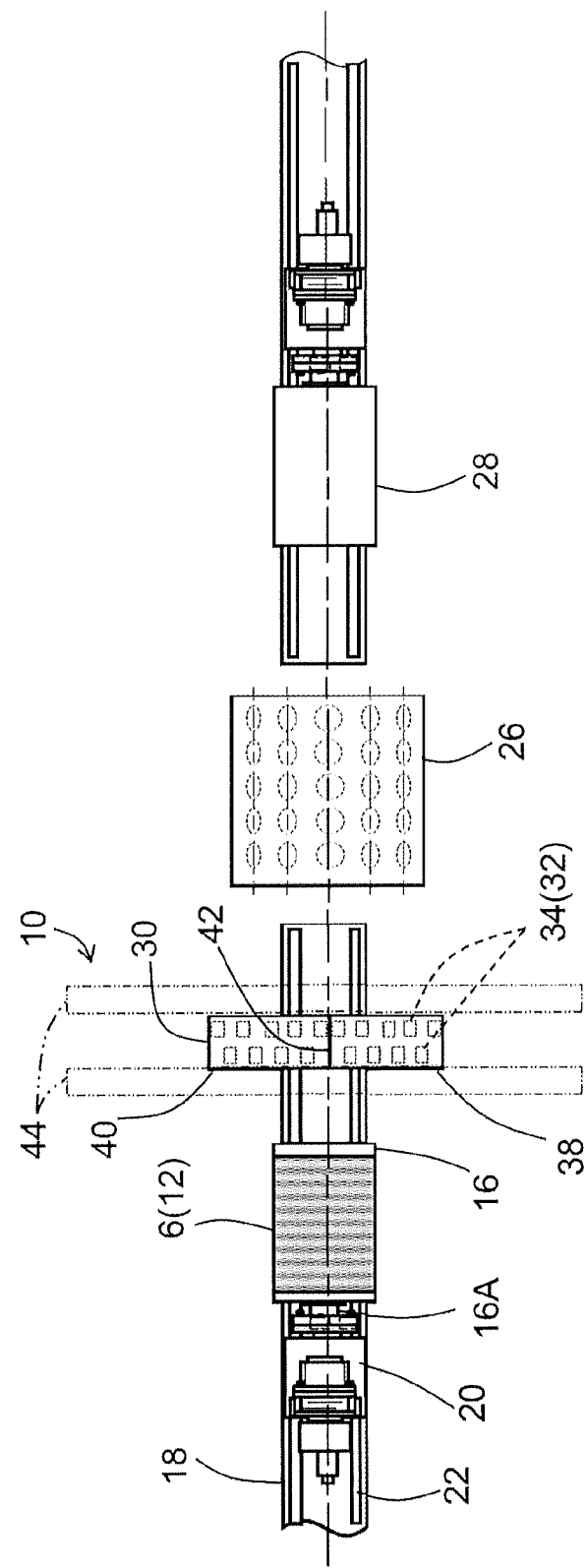
FIG. 2 is a plan view showing a carcass band building drum, the stitcher device, a transfer device, and a bead set drum in the embodiment.
Figure 3:
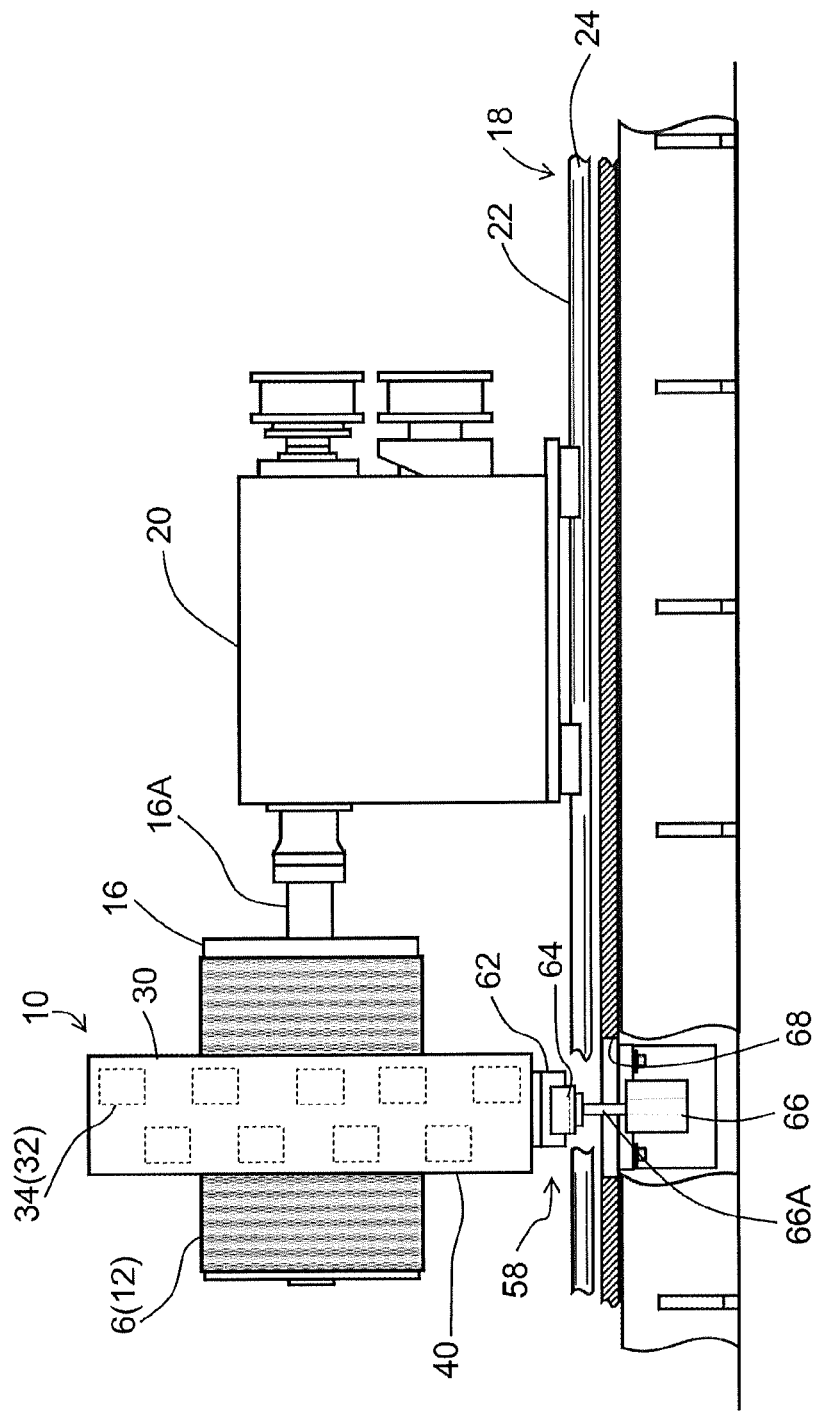
FIG. 3 is a side view at a pressure-bonding stage by the stitcher device.

As shown in FIGS. 2 and 3, a building drum 16 for building the carcass band 12 is configured to be movable along a drum guide path 18. The building drum 16 has a peripheral surface having a width larger than the width of the carcass band 12 to be built, and is configured to be expandable and contractible by a plurality of pieces for peripheral surface configuration.

The building drum 16 is supported by a drum support 20. The drum support 20 supports the building drum 16 in a cantilevered state so as to be rotationally driven at one end of a shaft portion 16A, and is also referred to as a headstock. The drum support 20 is configured to move the building drum 16 along the drum guide path 18 by traveling on a rail 22 provided on the drum guide path 18 with a motor.

The drum guide path 18 includes the rail 22 and a support base 24 that supports the rail 22. The drum guide path 18 extends to each building position such that the building drum 16 can be moved to the building positions (not shown) for winding the rubber member 14 around the outer periphery of the building drum 16 and further winding the carcass ply 6 thereon. In addition, the drum guide path 18 extends to the front of a carcass band take-out position such that the building drum 16 can be moved to the stitcher device 10 after the carcass ply 6 is wound, and then the building drum 16 can be moved to the carcass band take-out position (a position of a transfer device 26 shown in FIG. 2) at which the transfer device 26 waits.

A method for winding the rubber member 14 such as the inner liner 1 and the rim strip 4 around the peripheral surface of the building drum 16 is not particularly limited. For example, the rubber member 14 may be laminated and formed by spirally winding a ribbon-shaped rubber strip extruded by an extruder around the building drum 16.

A method for winding the carcass ply 6 on the rubber member 14 is not particularly limited. For example, the one or a plurality of ply sheets may be supplied from each servicer, and the ply sheets may be cylindrically wound around the rubber member 14 of the building drum 16 around which the rubber member 14 is wound. In this case, in order to attach the ply tape between the ply sheets, for example, the ply tape may be laminated and formed by winding the ribbon-shaped rubber strip extruded by the extruder.

The transfer device 26 is a device for receiving the carcass band 12 from the building drum 16 and transferring it to a bead set drum 28, which is a building drum for building a green case as a next step, and can adopt a known configuration.

The transfer device 26 has a space capable of receiving the building drum 16, and receives the carcass band 12 from the building drum 16 by holding the carcass band 12 from an outer peripheral side. Then, after the building drum 16 exits from the transfer device 26, the bead set drum 28 enters the transfer device 26 and receives the carcass band 12 from the transfer device 26. As a result, delivery to the bead set drum 28 is performed.

The stitcher device 10 is a device in which the carcass ply 6 is attached to and laminated on the rubber member 14, and then the carcass ply 6 is pressed against the outer periphery of the rubber member 14 over the entire periphery to be pressure-bonded. The stitcher device 10 is installed so as to be adjacent to a building position where the carcass ply 6 is wound around the building drum 16 and to face a non-support side of the building drum 16 supported in a cantilever manner by the drum support 20.

As shown in FIG. 1, the stitcher device 10 includes an annular frame 30 that can surround the outer periphery of the building drum 16 over the entire periphery by inserting the building drum 16. The annular frame 30 is provided such that the building drum 16 can pass therethrough in an axial direction in a space inside it. Specifically, the annular frame 30 faces the building drum 16 supported in a cantilever manner by the drum support 20, is disposed so as to be axially aligned with the building drum 16, and has an inner periphery in a circular shape having a diameter larger than that of the building drum 16.

The annular frame 30 is provided with a pressure-bonding device 32 for pressing the carcass ply 6 wound around the outer periphery of the building drum 16 from the outer periphery of the carcass ply 6 and pressure-bonding the carcass ply 6 to the rubber member 14. The pressure-bonding device 32 is not particularly limited as long as the pressure-bonding device can pressure-bond the carcass ply 6 to the rubber member 14 on an inner side by pressing the carcass ply 6.

Figure 10:
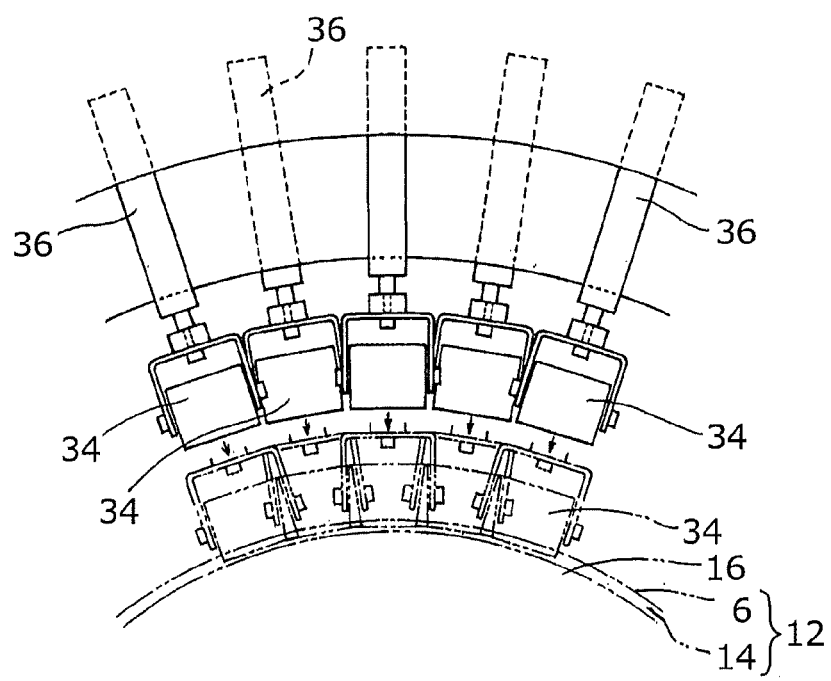
FIG. 10 is a partially enlarged front view showing arrangements of pressure-bond rollers of the stitcher device.

In this example, the pressure-bonding device 32 is configured by pressure-bond rollers described in US 2010/0043949 A1, which is incorporated by reference. That is, as shown in FIG. 1, in the pressure-bonding device 32, a plurality of pressure-bond rollers 34 are arranged on an inner periphery of the annular frame 30. The plurality of pressure-bond rollers 34 have an axial center in a tangential direction on a concentric circle having a diameter larger than that of the building drum 16, are rotatably arranged around the axial center, and are arranged in a plurality of rows (two rows in the figure) in the peripheral direction and in a circle shape at a constant pitch. As shown in FIG. 10, each of the pressure-bond rollers 34 is supported so as to be able to advance and displace inward in a radial direction by an advancing and retreating unit 36 such as a cylinder device. The pressure-bond rollers 34 and 34 in each row are arranged so as to be displaced in the peripheral direction so as not to be spaced apart from each other in the peripheral direction as a whole in an advance-displacement state inward in the radial direction, and are provided so as to partially overlap the pressure-bond rollers 34 in the adjacent row in the axial direction. As a result, the carcass ply 6 on the building drum 16 passing through inward a circular arrangement of the pressure-bond rollers 34 can be pressed simultaneously over the entire periphery by the pressure-bond rollers 34. In FIGS. 1 and 4 to 6, the two rows of the pressure-bond rollers 34 and the advancing and retreating units 36 are shown by solid lines in a front row and dotted lines in a back row.

The annular frame 30 is provided so as to be openable and closable by being divided into a plurality of parts in the peripheral direction. The peripheral direction of the annular frame 30 is a direction on a circumference centered on the axial center thereof, and is a direction along the outer periphery of the building drum 16.

Figure 6:
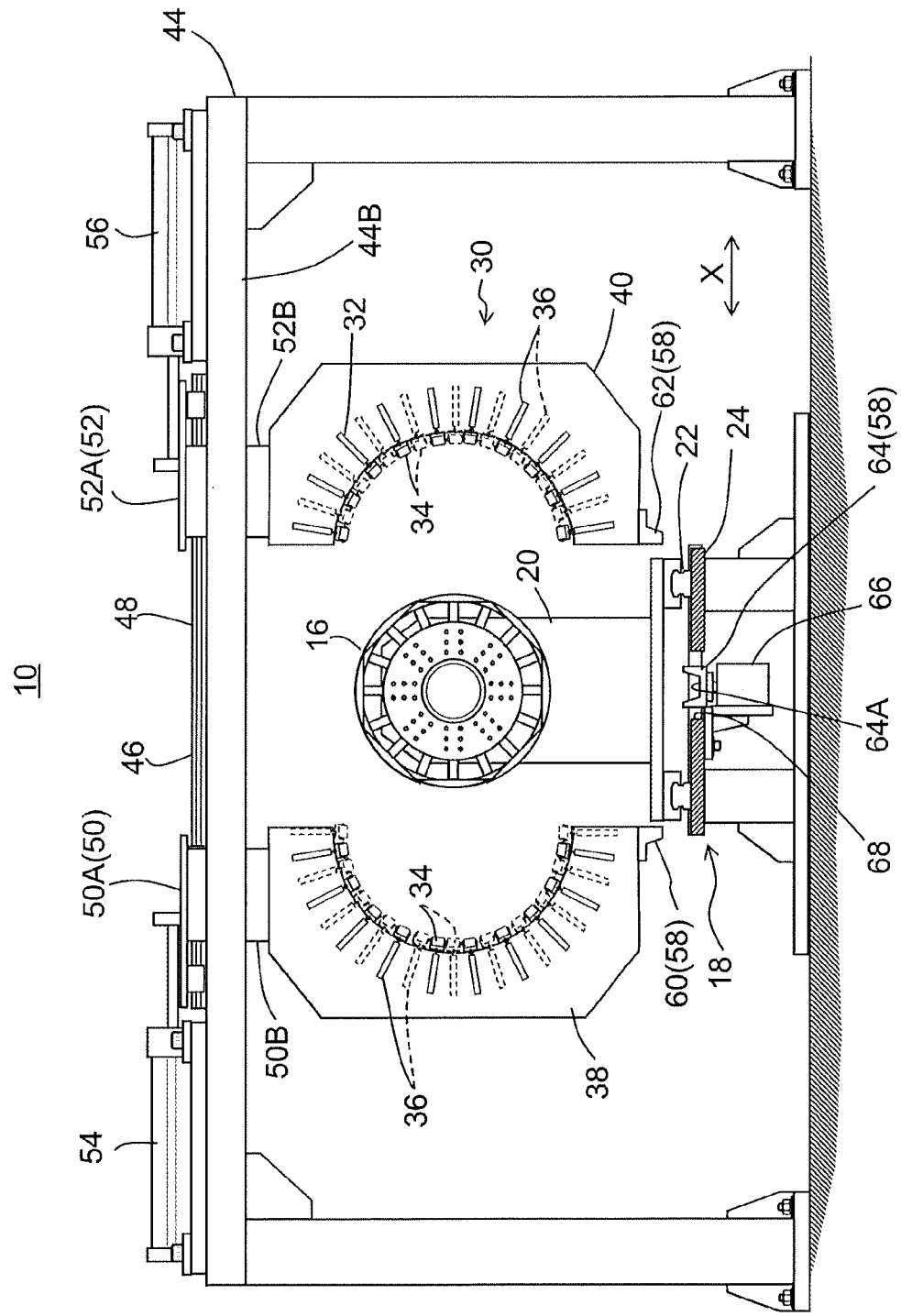
FIG. 6 is a front view showing a state in which an annular frame of the stitcher device is opened.
Figure 8:
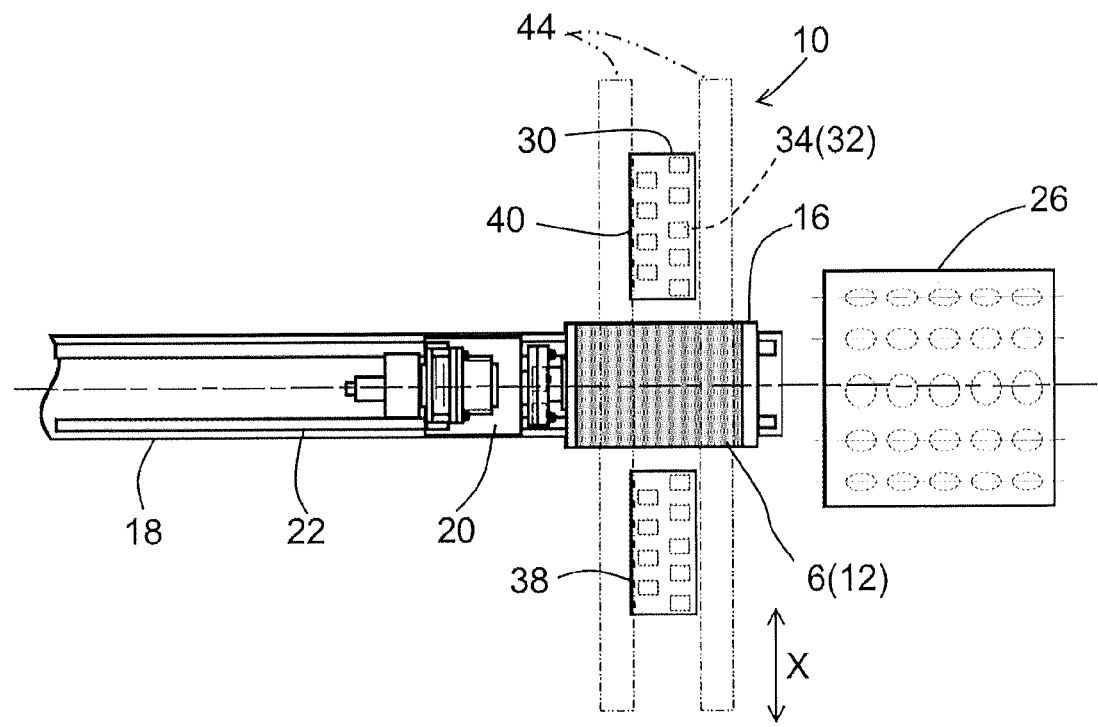
FIG. 8 is a plan view showing a state in which the annular frame of the stitcher device is opened.

In this example, the annular frame 30 is a two-division type frame including a pair of left and right frame portions 38 and 40 facing each other in a horizontal direction, and is opened and closed in a left-right direction X as shown in FIGS. 6 and 8. That is, the annular frame 30 includes the pair of left and right frame portions 38 and 40 that are movable in a direction perpendicular to an axis of the annular frame 30, in this example, in the horizontal direction. By moving the pair of frame portions 38 and 40 in the horizontal direction so as to be separated from each other, the annular frame 30 is in an opened state. Here, the direction perpendicular to the axis of the annular frame 30 is a direction perpendicular to the axial center (a center) of the annular frame 30, and corresponds to a radial direction in a hollow portion having a circular cross section.

More specifically, as shown in FIGS. 1 and 2, the pair of frame portions 38 and 40 divide the annular frame 30 into right and left substantially evenly by using a vertical surface parallel to the axial direction of the annular frame 30 as a dividing surface 42. Then, by moving the pair of frame portions 38 and 40 so as to be separated from each other toward both sides sandwiching the drum guide path 18, the annular frame 30 is in the opened state. In addition, by bringing the pair of frame portions 38 and 40 close to each other and joining them, the annular frame 30 is in a closed state, and is formed in an annular shape capable of surrounding the building drum 16 over the entire periphery.

As shown in FIG. 1, the annular frame 30 is suspended from a portal frame 44. The portal frame 44 includes a pair of posts 44A and 44A provided on both sides of the drum guide path 18, and a horizontal member 44B bridged between the pair of posts 44A and 44A. The horizontal member 44B extends in a direction perpendicularly intersecting the drum guide path 18 above the drum guide path 18.

The horizontal member 44B of the portal frame 44 is provided with a frame guide path 46 for horizontally moving the pair of frame portions 38 and 40. The frame guide path 46 includes a rail 48 provided on an upper surface of the horizontal member 44B, and extends in the direction perpendicularly intersecting the drum guide path 18 above the drum guide path 18.

A pair of left and right frame supports 50 and 52 for suspending and supporting the pair of frame portions 38 and 40 are provided on the frame guide path 46 so as to be slidable along the frame guide path 46. The frame supports 50 and 52 include traveling portions 50A and 52A that can travel on the rail 48, and hanging portions 50B and 52B that hang from the traveling portions 50A and 52A and respectively hold the pair of frame portions 38 and 40.

The horizontal member 44B of the portal frame 44 is provided with drive portions 54 and 56 such as cylinder devices for performing advancing and retracting displacement of the traveling portions 50A and 52A of the frame supports 50 and 52 along the rail 48, respectively. The pair of frame supports 50 and 52 are configured to open and close the annular frame 30 by moving in a direction away from each other and a direction approaching each other along the frame guide path 46 by the drive portions 54 and 56. That is, the pair of frame supports 50 and 52 move in the direction away from each other by the drive portions 54 and 56, whereby the pair of frame portions 38 and 40 are opened to the left and right, and the annular frame 30 is in the opened state shown in FIG. 6. Then, in this state, the pair of frame supports 50 and 52 move in the direction approaching each other by the drive portions 54 and 56, whereby the pair of frame portions 38 and 40 are brought close to each other and joined, and the annular frame 30 is in the closed state shown in FIG. 1.

A fixing portion 58 for fixing the annular frame 30 in the closed state is provided on a bottom side of the annular frame 30. In this example, the fixing portion 58 includes a pair of frame side engaging portions 60 and 62 respectively provided at bottoms of the pair of frame portions 38 and 40, and a guide path side engaging portion 64 provided on the drum guide path 18 side.

As shown in FIG. 1, in the state where the annular frame 30 is closed, the frame side engaging portions 60 and 62 are configured such that both frame side engaging portions 60 and 62 are integrated to have a convex shape having a narrower width toward a tip end (that is, a lower end). In other words, the pair of frame side engaging portions 60 and 62 are formed by dividing a convex portion having a tapered cross-section provided on a bottom surface of the annular frame 30 into left and right on the extension of the dividing surface 42. In the state where the annular frame 30 is closed, the pair of frame side engaging portions 60 and 62 are joined to form the convex portion having a tapered cross-section that has inclined surfaces on both left and right sides (a trapezoidal convex portion whose width gradually narrows toward the tip end in a cross section perpendicular to the axis center of the annular frame 30).

The guide path side engaging portion 64 has a concave shape in which the integrated frame side engaging portions 60 and 62 are fitted, and fixes the annular frame 30 in the closed state by fitting the frame side engaging portions 60 and 62. That is, the guide path side engaging portion 64 has a concave portion 64A in which both side surfaces are inclined such that the width becomes narrower toward the bottom side, corresponding to the convex portion having a tapered cross-section of the frame side engaging portions 60 and 62.

The guide path side engaging portion 64 is supported so as to be displaceable in a vertical direction by an advancing and retreating unit 66 such as a cylinder device. The advancing and retreating unit 66 is attached to a lower surface of the support base 24 of the drum guide path 18. An output shaft 66A of the advancing and retreating unit 66 protrudes upward from an opening 68 provided in the support base 24, and the guide path side engaging portion 64 is attached to an upper end of the output shaft 66A.

The method for pressure-bonding the carcass ply 6 using the stitcher device 10 described above and then taking out the carcass band 12 is performed as follows.

Figure 7:
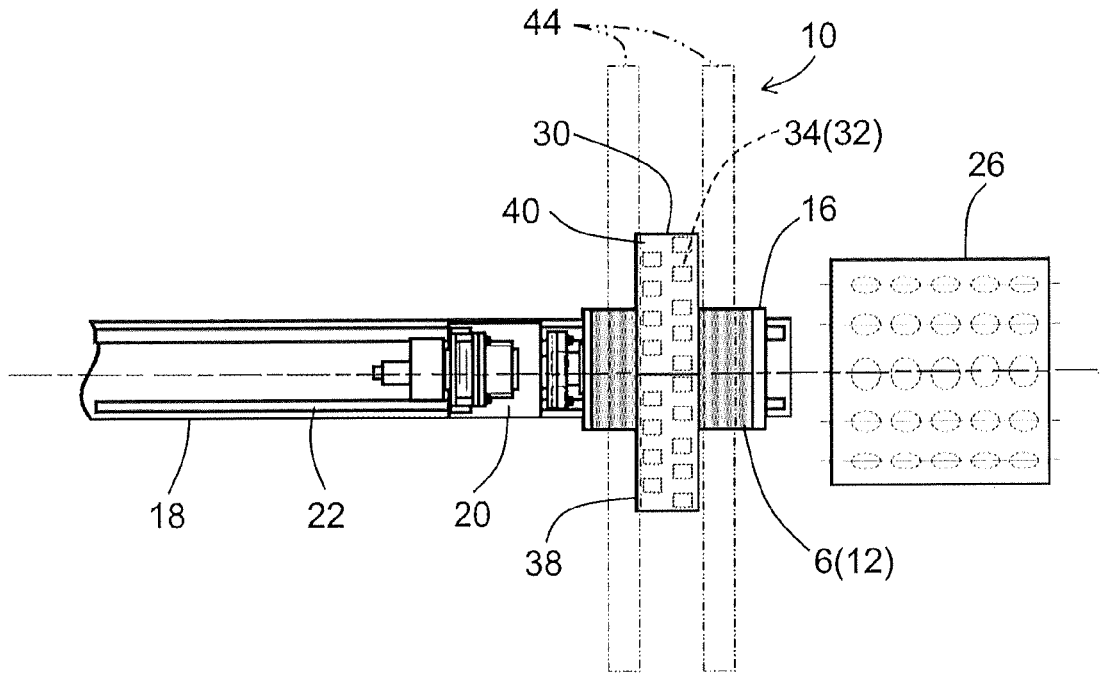
FIG. 7 is a plan view showing a state in which the building drum is inserted into the annular frame of the stitcher device.

After the carcass ply 6 is attached on the rubber member 14 wound around the building drum 16 (see FIG. 2), the building drum 16 is moved to the stitcher device 10 and inserted inside the annular frame 30 to pressure-bond the carcass ply 6 (see FIG. 7).

As a method of pressure-bonding the carcass ply 6, the pressure-bond rollers 34 of the annular frame 30 may be displaced inward in the radial direction in advance by the advancing and retreating units 36, and in this state, the building drum 16 may axially enter the inside of the annular frame 30, and the carcass ply 6 on the building drum 16 may be pressed by the pressure-bond rollers 34 from one end to the other end at the same time as entering. Alternatively, in a state where the pressure-bond rollers 34 are positioned outward in the radial direction, the building drum 16 may enter the vicinity of a central portion in the axial direction inside the annular frame 30, and the pressure-bond rollers 34 may be displaced inward in the radial direction by the advancing and retreating units 36 and the carcass ply 6 may be pressed while the building drum 16 is moved to both sides in the axial direction with reference to the vicinity of the central portion.

Figure 4:
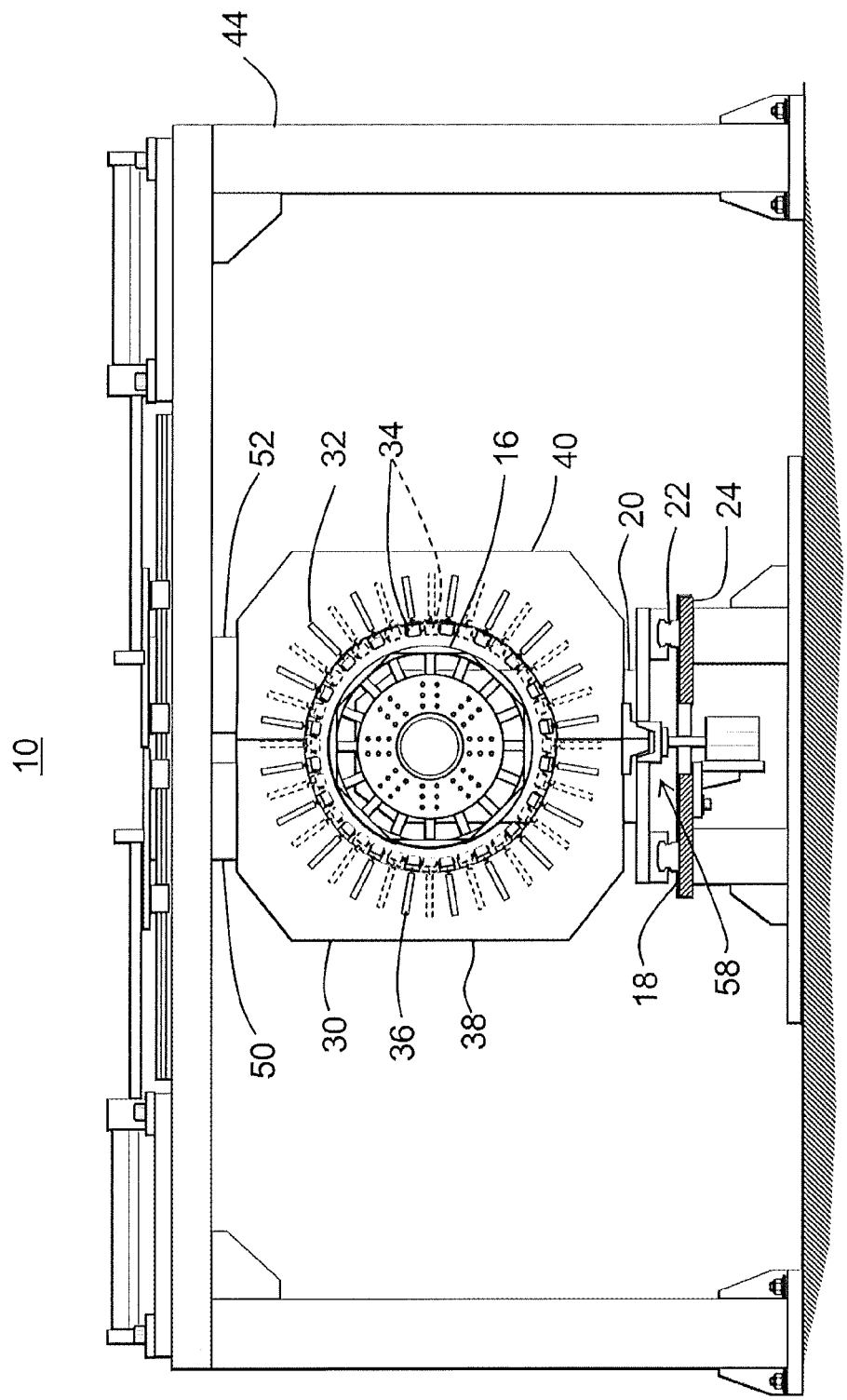
FIG. 4 is a front view showing a state immediately after pressure-bonding in the stitcher device.
Figure 5:
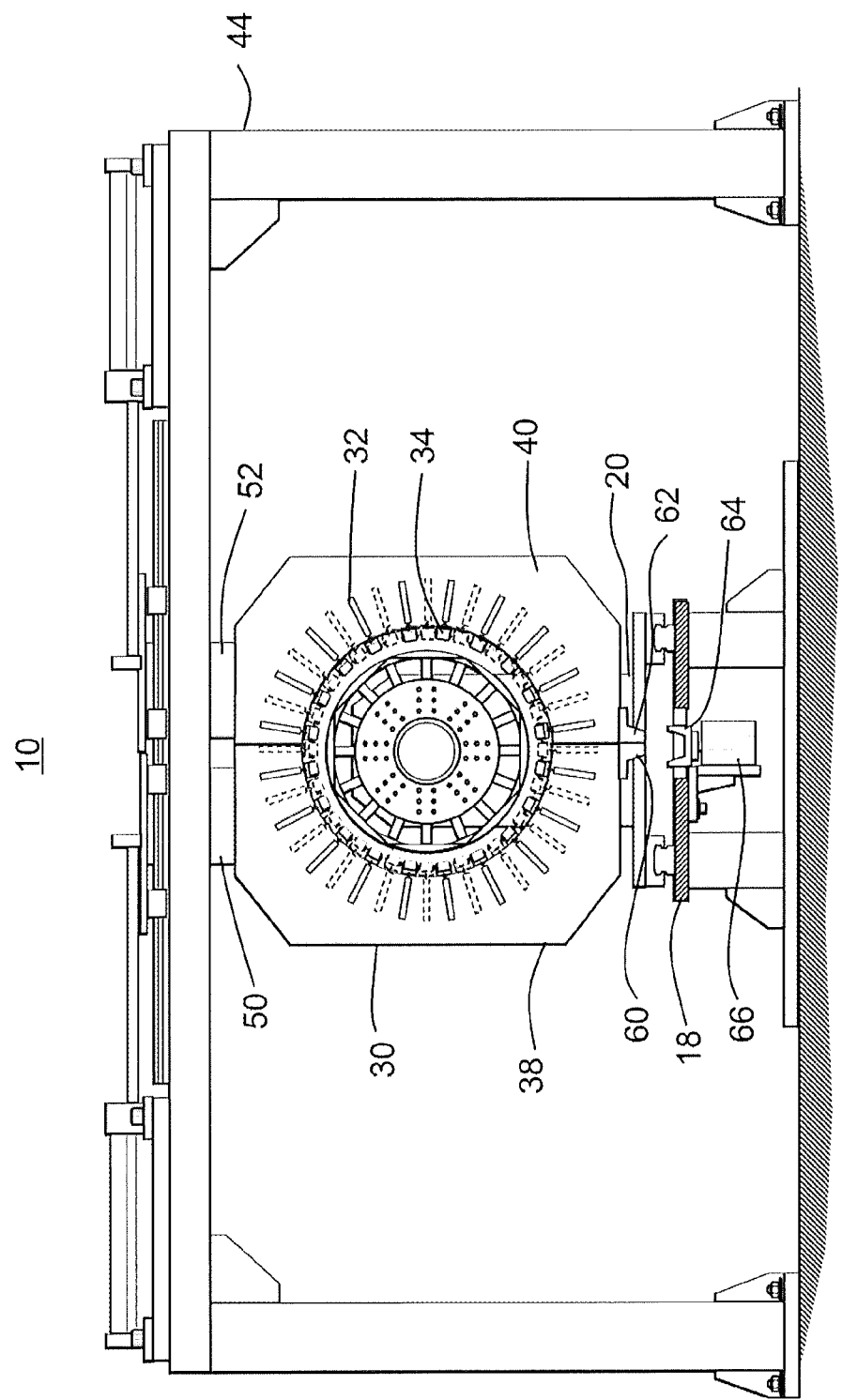
FIG. 5 is a front view showing a state in which fixing by a fixing portion is released after completion of pressure-bonding in the stitcher device.

After the carcass ply 6 is pressure-bonded in this manner, the pressure-bond rollers 34 are displaced outward in the radial direction by the advancing and retreating units 36 (see FIG. 4). Thereafter, the fixing by the fixing portion 58 is released on the bottom side of the annular frame 30. Specifically, as shown in FIG. 5, the guide path side engaging portion 64 is displaced downward by the advancing and retracting unit 66 to release the engagement with the frame side engaging portions 60 and 62. As a result, the fixing can be released in a short time immediately after the pressure-bonding is completed.

Thereafter, the drive portions 54 and 56 slide the pair of frame supports 50 and 52 in the direction away from each other. As a result, as shown in FIGS. 6 and 8, the pair of frame portions 38 and 40 are opened to the left and right, and the annular frame 30 is in the opened state.

Figure 9:
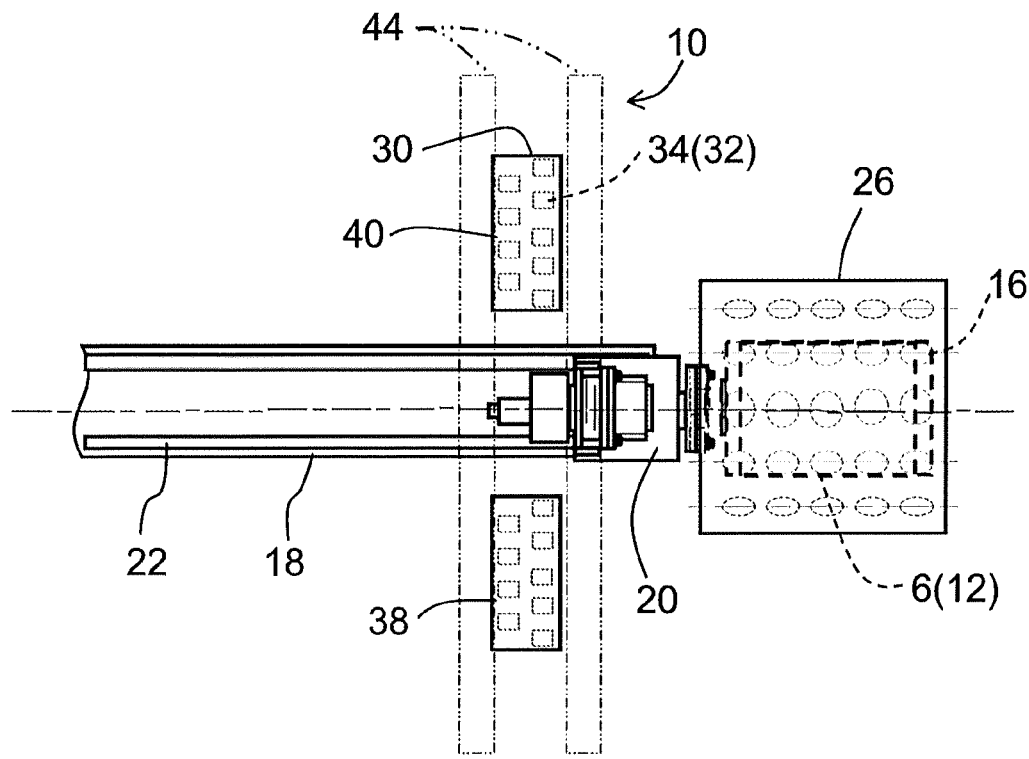
FIG. 9 is a plan view showing a state in which the building drum is moved to a carcass band take-out position in the embodiment.

When the annular frame 30 is in the opened state, a gap through which the drum support 20 can pass along the drum guide path 18 together with the building drum 16 is formed between the pair of frame portions 38 and 40. Therefore, as shown in FIG. 9, the drum support 20 can be moved through the gap between the pair of frame portions 38 and 40 to the carcass band take-out position where the building drum 16 delivers the carcass band 12 to the transfer device 26.

At the carcass band take-out position, the building drum 16 is inserted into the transfer device 26, and in this state, the transfer device 26 holds the carcass band 12 from the outer peripheral side to receive the carcass band 12. Thereafter, the building drum 16 moves on the drum guide path 18 to exit from the transfer device 26, and returns to a building position for winding the rubber member 14 through the gap between the pair of frame portions 38 and 40.

After the building drum 16 passes through the gap between the pair of frame portions 38 and 40, the pair of frame supports 50 and 52 are slid and joined in the direction approaching each other by the drive portions 54 and 56 (see FIG. 5).

Thereafter, the pair of frame supports 50 and 52 are fixed to the bottom side of the annular frame 30 by the fixing portion 58. In this example, the guide path side engaging portion 64 is displaced upward by the advancing and retracting unit 66 and is engaged with the frame side engaging portions 60 and 62. That is, the convex portion having a tapered cross-section that is formed by joining the pair of frame side engaging portions 60 and 62 is fitted in the concave portion 64A by moving the guide path side engaging portion 64 upward. As a result, the pair of frame portions 38 and 40 are fixed at the bottom side of the annular frame 30, and the annular frame 30 is in the closed state.

From the above, a take-out operation of the carcass band 12 from the building drum 16 is completed.

In the present embodiment, in the stitcher device 10 provided between the building position for winding the carcass ply 6 and the take-out position of the carcass band 12, the annular frame 30 including the pressure-bonding device 32 is configured so as to be openable and closable to the left and right. Therefore, the annular frame 30 is opened by moving the left and right frame portions 38 and 40 on both sides sandwiching the drum guide path 18 after the pressure-bonding by the pressure-bonding device 32, so that the building drum 16 can pass through the gap between the opened pair of frame portions 38 and 40 together with the drum support 20. Therefore, after the carcass ply 6 is pressure-bonded, the building drum 16 can be moved forward to the carcass band take-out position as it is without retracting once. Accordingly, the time required for taking out the carcass band 12 can be shortened.

In addition, the annular frame 30 is suspended, that is, is suspended and supported from the frame guide path 46 provided above the drum guide path 18 via the frame supports 50 and 52, and the annular frame 30 is fixed by the fixing portion 58 on the bottom side thereof so as to be in a closed state. Therefore, the pair of frame portions 38 and 40 can be fixed so as not to be displaced to the left and right due to a pressure at the time of pressing the carcass ply 6 by the pressure-bonding device 32.

In addition, since the fixing portion 58 is configured by fitting the convex portion having a tapered cross-section that is formed by the joining of the pair of frame side engaging portions 60 and 62 and the concave portion 64A of the guide path side engaging portion 64, the axis center of the annular frame 30 can be positioned and fixed by the guide path side engaging portion 64. Therefore, when the left and right two-division type annular frame 30 is closed, the axial center thereof does not shift to the left or right with respect to the axial center of the building drum 16, and the building drum 16 and the annular frame 30 can be axially aligned with each other with a simple configuration.

The fixing method by the fixing portion 58 is not limited to the mechanical fixing by the engagement between the pair of frame side engaging portions 60 and 62 and the guide path side engaging portion 64 as described above, and the fixing may be realized by, for example, an electromagnetic method.

In the embodiment described above, the annular frame 30 is a two-division type annular frame, but the number of divisions is not limited as long as the annular frame is divided into a plurality of parts, and the annular frame may be divided into, for example, three or four parts.

In the embodiment described above, the pair of left and right frame portions 38 and 40 are moved away from each other on both sides of the drum guide path 18 to make the annular frame 30 in the opened state, and a gap through which the building drum 16 passes together with the drum support 20 is formed. Similarly, when the annular frame includes three or more frame portions, the plurality of frame portions may be provided so as to be movable in the direction perpendicular to the axis of the annular frame, and the annular frame may be in the opened state by moving the plurality of frame portions in the direction away from each other in the direction perpendicular to the axis. As a result, the gap through which the building drum passes together with the drum support can be formed, and the building drum can pass through the gap and move to the carcass band take-out position.

Figure 11:
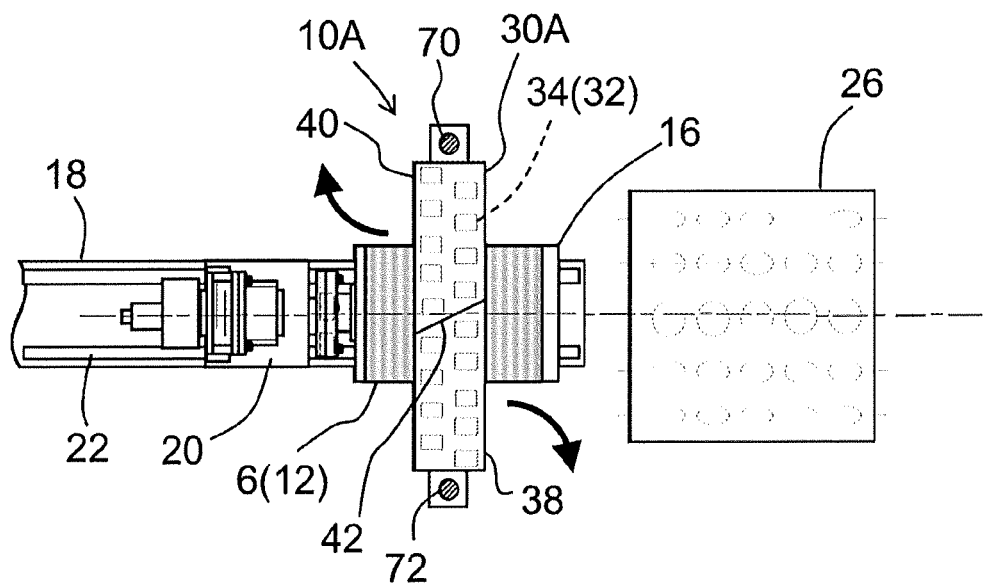
FIG. 11 is a plan view showing an opening and closing operation of a stitcher device according to another embodiment.

The moving direction of the frame portions 38 and 40 when the annular frame 30 is opened and closed is not limited to the direction perpendicular to the axis of the annular frame 30 (the left-right direction X in the embodiment described above). For example, as in a stitcher device 10A of another embodiment shown in FIG. 11, an annular frame 30A may be opened and closed by rotating the pair of left and right frame portions 38 and 40 forward and backward, respectively.

That is, the pair of left and right frame portions 38 and 40 are provided so as to be rotatable around vertical shafts 70 and 72 respectively installed on both sides sandwiching the drum guide path 18. From the closed state shown in FIG. 11, as shown by arrows, the frame portion 40 (one) rotates rearward, that is, toward the building position side of the carcass ply 6, and the frame portion (the other one) rotates forward, that is, toward the take-out position side of the carcass band 12. Therefore, the dividing surface 42 is inclined with respect to the axial direction of the annular frame 30, so that the tip ends thereof do not interfere with each other when the frame portions 38 and 40 rotate.

While certain embodiments have been described, these embodiments have been presented as examples only, and are not intended to limit the scope of the invention. These embodiments can be carried out in various other forms, and various omissions, replacements, and modifications can be made thereto without departing from the scope of the invention. The accompanying claims and their equivalents are intended to cover such forms or modifications as would fall within the scope and spirit of the inventions.

What is claimed is:

1. A stitcher device for pressure-bonding a carcass ply to a rubber member, the carcass ply being wound around an outer periphery of a building drum movable along a drum guide path via the rubber member, the stitcher device comprising:
    an annular frame including a pair of frame portions across from each other, the annular frame being able to surround the outer periphery of the building drum by inserting the building drum thereinto;
    a frame guide path provided above the building drum and the annular frame, the frame guide path extending in a direction intersecting the drum guide path above the drum guide path;
    a pair of frame supports slidably coupled to the frame guide path, each of the pair of frame supports configured to respectively suspend and support each of the pair of frame portions below the pair of frame supports, the pair of frame supports opening and closing the annular frame by moving in a direction away from each other and a direction approaching each other along the frame guide path;
    a fixing portion configured to fix the annular frame in a closed state on a bottom side of the annular frame; and
    a pressure-bonding device provided in the annular frame so as to be able to press the carcass ply from its outer periphery and pressure-bond the carcass ply to the rubber member.

2. The stitcher device according to claim 1, wherein the pair of frame portions are movable in a direction perpendicular to an axis of the annular frame, and the annular frame is in an opened state by moving the pair of frame portions in the direction perpendicular to the axis and separating the pair of frame portions from each other.

3. The stitcher device according to claim 2, wherein the pair of frame portions face each other in a horizontal direction.

4. The stitcher device according to claim 1, wherein the annular frame is a two-division type frame.

5. A stitcher device for pressure-bonding a carcass ply to a rubber member, the carcass ply being wound around an outer periphery of a building drum movable along a drum guide path via the rubber member, the stitcher device comprising:
    an annular frame including a pair of frame portions across from each other, the annular frame being able to surround the outer periphery of the building drum by inserting the building drum thereinto;
    a pressure-bonding device provided in the annular frame so as to be able to press the carcass ply from its outer periphery and pressure-bond the carcass ply to the rubber member;
    a frame guide path extending in a direction intersecting the drum guide path above the drum guide path;
    a pair of frame supports configured to suspend and support the pair of frame portions respectively, and to open and close the annular frame by moving in a direction away from each other and a direction approaching each other along the frame guide path; and
    a fixing portion configured to fix the annular frame in a closed state on a bottom side of the annular frame, wherein the fixing portion includes:
        a pair of frame side engaging portions that are respectively provided at bottoms of the pair of frame portions, and are integrated to have a convex shape having a narrower width toward a tip end when the annular frame is in the closed state; and
        a guide path side engaging portion that is provided on the drum guide path side and is configured to have a concave shape in which the integrated pair of frame side engaging portions are fitted, and fixes the annular frame in the closed state by fitting the integrated pair of frame side engaging portions.

6. The stitcher device according to claim 5, wherein the annular frame is a two-division type frame including the pair of frame portions facing each other in a horizontal direction.

7. The stitcher device according to claim 6, wherein the pair of frame portions are movable in a direction perpendicular to an axis of the annular frame, and the annular frame is in an opened state by moving the pair of frame portions in the direction perpendicular to the axis and separating the pair of frame portions from each other.

8. A stitcher device for pressure-bonding a carcass ply to a rubber member, the carcass ply being wound around an outer periphery of a building drum movable along a drum guide path via the rubber member, the stitcher device comprising:
    an annular frame including a pair of frame portions across from each other, the annular frame being able to surround the outer periphery of the building drum by inserting the building drum thereinto; and
    a pressure-bonding device provided in the annular frame so as to be able to press the carcass ply from its outer periphery and pressure-bond the carcass ply to the rubber member,
    wherein each of the pair of frame portions is rotatable around a vertical axis perpendicular to the drum guide path, the vertical axis being respectively provided on both sides of the drum guide path, and the annular frame is configured to open and close by rotating the pair of frame portions.

* * * * *